(12) United States Patent
Malone (10) Patent No.: US 6,857,667 B2
(45) Date of Patent: Feb. 22, 2005

(54) HIGH PRESSURE FLUID QUICK CONNECT

(75) Inventor: David S. Malone, Attica, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/183,266

(22) Filed: Jun. 25, 2002

(65) Prior Publication Data

US 2003/0234537 A1 Dec. 25, 2003

(51) Int. Cl.$^7$ ............................................. F16L 37/00
(52) U.S. Cl. ........................ 285/307; 285/383; 285/305; 285/902; 285/308
(58) Field of Search ................................ 285/27, 89, 232, 285/233, 307, 308, 313, 321, 374, 400, 143.1, 382.7, 6, 382, 386, 340, 902, 383

(56) References Cited

U.S. PATENT DOCUMENTS

| | | | | |
|---|---|---|---|---|
| 1,861,372 A | * | 5/1932 | Waters | 285/383 |
| 2,476,172 A | * | 7/1949 | Williams | 285/280 |
| 2,823,934 A | * | 2/1958 | Gorrell et al. | 285/316 |
| 3,279,835 A | * | 10/1966 | Krohm | 403/326 |
| 3,389,923 A | * | 6/1968 | Love, Jr. et al. | 285/321 |
| 3,773,360 A | * | 11/1973 | Timbers | 285/321 |
| 3,922,011 A | * | 11/1975 | Walters | 285/902 |
| 4,216,982 A | * | 8/1980 | Chow | 285/315 |
| 4,433,861 A | | 2/1984 | Kreczik | |
| 4,637,636 A | | 1/1987 | Guest | |
| 4,657,286 A | | 4/1987 | Guest | |
| 4,749,214 A | | 6/1988 | Hoskins et al. | |
| 4,772,051 A | | 9/1988 | Mann | |
| 4,842,309 A | | 6/1989 | LaVene et al. | |
| 4,850,622 A | * | 7/1989 | Suzuki | 285/308 |
| 5,022,687 A | * | 6/1991 | Ariga | 285/321 |
| 5,048,874 A | * | 9/1991 | Ohlsson | 285/307 |
| 5,176,413 A | * | 1/1993 | Westman | 285/321 |
| 5,448,804 A | | 9/1995 | Warren | |
| 5,498,042 A | | 3/1996 | Dole | |
| 5,516,157 A | * | 5/1996 | Williamson | 285/143.1 |
| 5,542,717 A | | 8/1996 | Rea et al. | |
| 5,573,279 A | | 11/1996 | Rea et al. | |

(List continued on next page.)

FOREIGN PATENT DOCUMENTS

GB      2 103 744 A      2/1983

OTHER PUBLICATIONS

A copy of the International Search Report dated Nov. 5, 2003.

*Primary Examiner*—Aaron Dunwoody
(74) *Attorney, Agent, or Firm*—Young & Basile, P.C.

(57) ABSTRACT

A fluid quick connect includes a body having a conical, split end retainer slidably mounted in a recess in at least one end of the body. The retainer has a leading edge extending into a through bore in the body which is engagable with an annular flange on an endform inserted into the housing forcing the retainer angularly outward in the recess to allow passage of the annular flange of the endform past the retainer. A biasing force on the retainer due to the expansion of the diameter of the retainer moves the retainer back to a position in which the leading edge extends behind the trailing edge of the annular flange on the endform to latch the endform in the housing. The retainer and conical recess maybe used at one end of the housing for connection with one end form or at both ends of the housing to fluidically couple two end forms.

25 Claims, 5 Drawing Sheets

U.S. PATENT DOCUMENTS

| | | | |
|---|---|---|---|
| 5,607,190 A | * 3/1997 | Exandier et al. | 285/308 |
| 5,662,359 A | 9/1997 | Kargula | |
| 5,681,060 A | 10/1997 | Berg et al. | |
| 5,681,062 A | 10/1997 | Fukao et al. | |
| 5,730,475 A | 3/1998 | Kargula | |
| 5,887,911 A | 3/1999 | Kargula | |
| 5,934,709 A | * 8/1999 | Morrison | 285/39 |
| 5,954,373 A | 9/1999 | Sorkin | |
| 5,992,515 A | 11/1999 | Spiegel | |
| 6,106,031 A | 8/2000 | Guginsky | |
| 6,231,090 B1 | 5/2001 | Fukao et al. | |
| 6,390,511 B1 | 5/2002 | Kargula | |

* cited by examiner

HIGH PRESSURE FLUID QUICK CONNECT

BACKGROUND

The present invention relates, in general, to fluid quick connectors which couple fluid components.

Snap-fit or quick connectors are employed in a wide range of applications, particularly, for joining fluid carrying conduits in automotive and industrial applications. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

In brake fluid connections, the high pressure brake lines typically employ threaded connections for connecting two high pressure lines together. A male and female threaded connection must be properly aligned and tightened to the specified torque. This involves care in assembly which adds to the overall assembly time.

It would be desirable to provide a fluid quick connect for use in high pressure applications which eliminates the need for assembly tools to complete the connection.

It would still be desirable to provide a fluid quick connect which is useful in high pressure applications to provide an easy and convenient fluid connection to interconnected fluid elements, such as an interconnection between a brake line and a mating housing, caliper or fluid or reservoir.

SUMMARY

The present invention is a high pressure fluid quick connect useful in attaching a fluid conduit to a mating fluid operative element.

In one aspect, the present fluid quick connect fluidically couples an endform having an enlarged annular flange spaced from one end and a fluid operative device. The fluid quick connect includes a housing having a through bore extending between first and second ends. An angular recess is formed in the housing adjacent to at least the first end of the housing, the recess communicating with the bore in the housing.

A retainer is mounted in the recess and is moveable from a first position disposed in interference with the annular flange on an endform inserted through the first end of the housing to a second position by contact with the annular flange on the endform during insertion of the endform in the housing allowing passage of the annular flange past the leading edge of the retainer. The retainer is movable back to the first position after the annular flange on the endform has been inserted past the leading edge of the retainer to latch the endform in the housing.

The retainer is mounted in a conical-shaped recess in the body. The retainer has a conically-shaped body with a through bore. A discontinuity is formed in the conical body and forms first and second expandable ends in the conical body.

Another aspect of the invention is a method of manufacturing a high pressure fluid quick connect. The method includes the steps of:

forming a body having a through bore extending from an open end;

forming a recess adjacent the open end of the body; and capturing a retainer in the recess of the body; and A fluid coupling also forms the invention. The fluid coupling includes an endform having an enlarged diameter annular flanged spaced from a tip end and a quick connector. A fluid quick connect includes a housing having a through bore extending between first and second ends. An angular recess is formed in the housing adjacent at least the first end of the housing, the recess communicating with the bore in the housing. A retainer is captured in the recess and moveable from a first position adapted for interference with the annular flange on an endform inserted through the first end of the housing to a second position by contact with the annular flange on the endform during insertion of the endform allowing passage of the annular flange passed the leading edge of the retainer. The retainer is moveable back to the first position after the annular flanged on endform has been inserted past the leading edge of the retainer to latch the endform in the housing. The second end of the housing is mounted in a fluid use device.

The fluid quick connect of the present invention can be advantageously employed in high pressure fluid coupling applications without the need for the typical threaded connection between an endform and the connector. This eliminates the need for special assembly tools thereby simplifying and reducing the cost of assembling the fluid quick connect of the present invention. The retainer employed in the inventive fluid quick connect may also be employed at the both ends of a housing to form a single point connection between the endforms on two tubular conduits.

The present high pressure fluid quick connect provides a low cost fluid coupling solution to high pressure fluid connections, a fluid coupling in which the connector can be installed in a quality controlled environment on a use element, and a fluid connection that does not require assembly tools at the end customer to complete the connection.

BRIEF DESCRIPTION OF THE DRAWING

The various features, advantages and other uses of the present invention will become more apparent by referring to the following detailed description and drawing in which.

DETAILED DESCRIPTION

Referring now to the drawing, and to FIGS. 1–6 in particular, there is depicted one aspect of a fluid quick connect 10 according to the present invention. Although the fluid quick connect 10 may be employed in many diverse high pressure, fluid applications, it will be understood that the following description of the fluid quick connect 10 in a high pressure vehicle brake line application is by way of example only. Further, the term "fluid" used in connection with the present invention will be understood to encompass any liquid, such as fuel, water, for example, and, also, any gas or vapor.

The fluid quick connect 10 includes a housing 12 which is attachable to a fluid operative device 14, such as a brake line terminal, caliper, brake fluid reservoir, ABS housing, etc. Although the housing 12 is provided with external threads 16 extending from a first end 18 for threaded attachment with mating threads 20 in a bore 22 in the fluid operative device 14, it will be understood that the fluid quick connect 10 of the present invention may employ a housing which is integrally formed as a one-piece extension of the fluid operative device 14. The housing 12 is formed of a suitable high strength material, such as metal, or a high strength plastic, etc.

Figure 1:
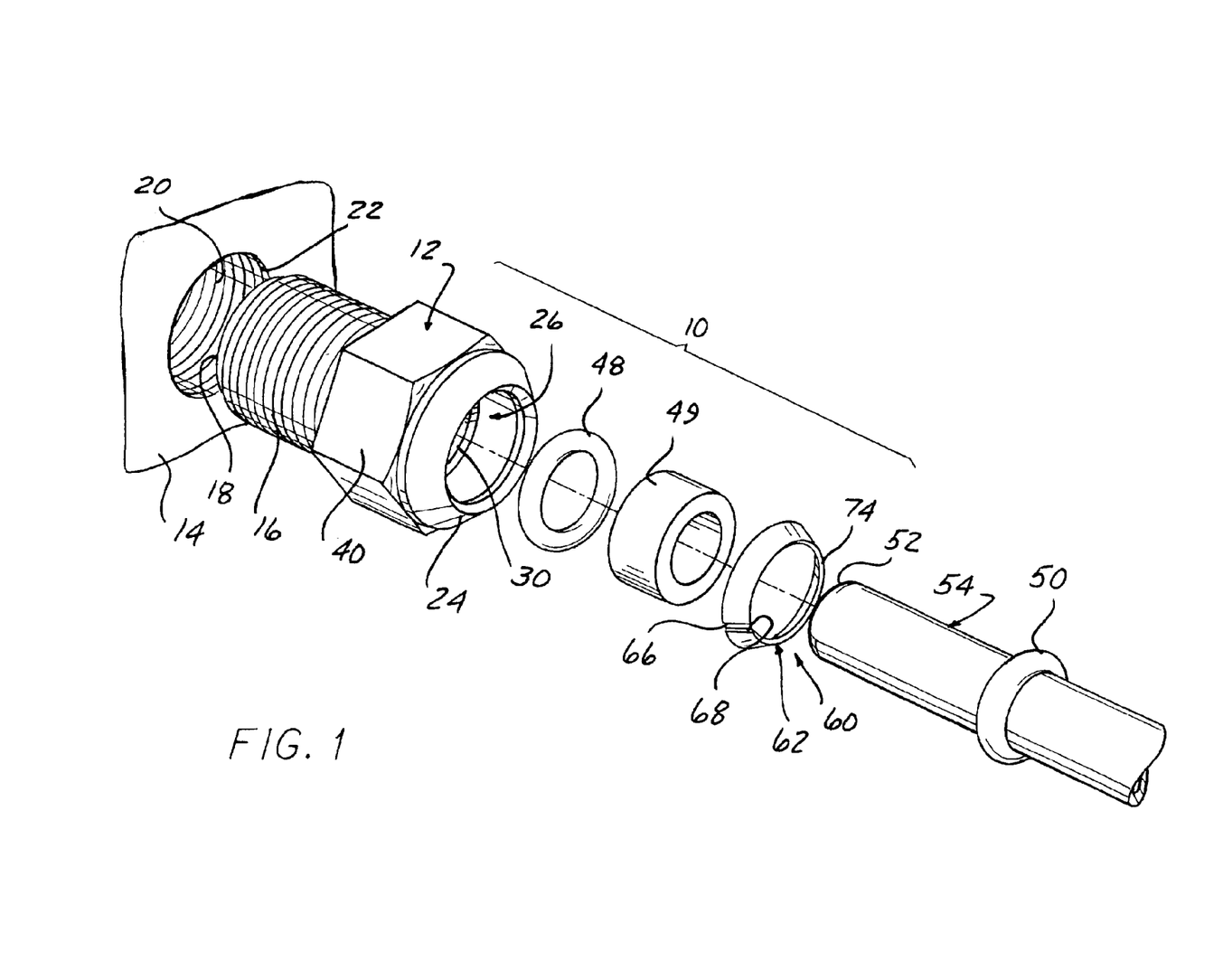
FIG. 1 is an exploded, perspective view of one aspect of a fluid quick connect according to the present invention.

As shown in FIG. 1 and in greater detail in FIGS. 2A–5, the housing 12 also includes a second end 24 with a through bore 26 extending completely from the second end 24 to the first end 18.

By way of example only, the bore 26 is in the form of a stepped bore having a first diameter end bore portion 30, an intermediate, smaller diameter bore portion 32, and a yet smaller diameter second end bore portion 34.

A plurality of flats, such as hex flats 40, are formed externally on the housing 12 adjacent the second end 24. The flats 40 provide for threading attachment of the housing 12 in the bore 22 in the fluid operative device 14. However, it would be understood that the provision of the flats 40 is by way of example only as the housing 12 may be effectively utilized without the flats 40.

Figure 2A:
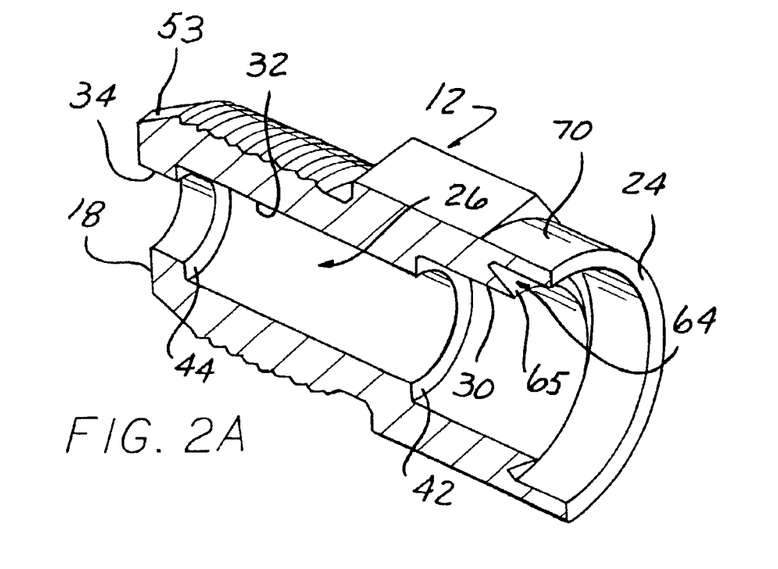
FIG. 2A is a longitudinal cross-sectional, perspective view of the housing of the fluid quick connect shown in FIG. 1, depicted in a preassembled state.
Figure 2B:
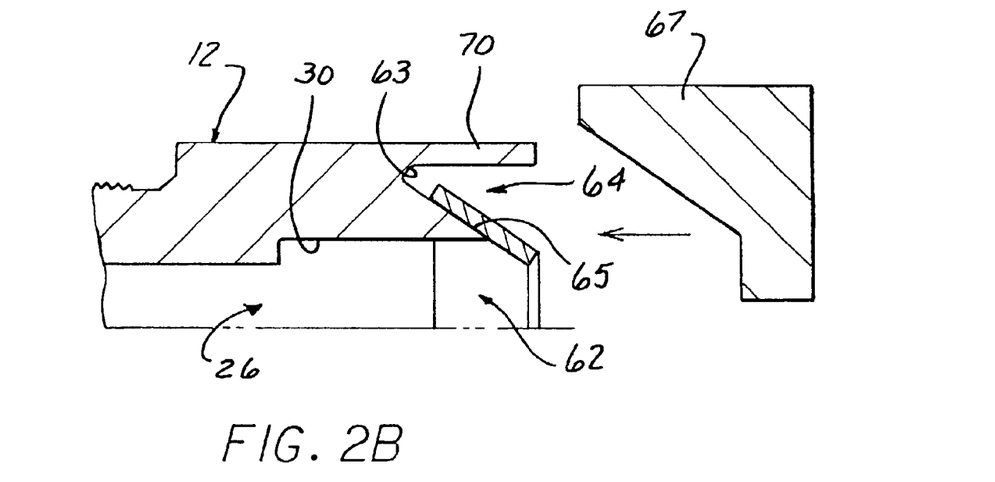
FIGS. 2B and 2C are side cross-sectional views of the process for forming the recess in the quick connect housing.
Figure 4A:
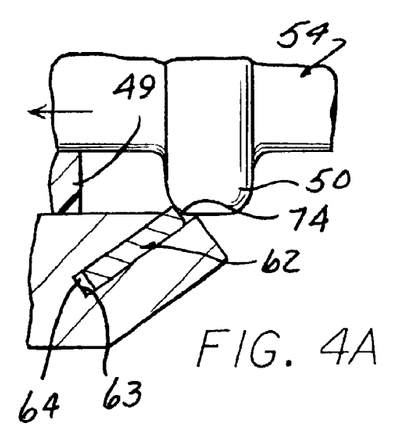
FIGS. 4A and 4B are enlarged, side elevational, cross-sectional views showing the movement of the retainer between first and second positions.
Figure 4B:
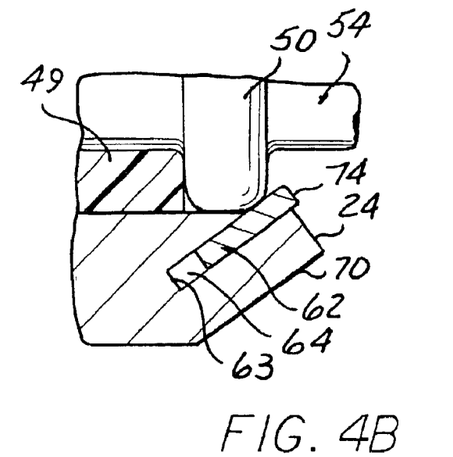

As shown in FIGS. 2A, 2B and 4, an annular shoulder or angled flat 42 is formed at the juncture of the first end bore portion 30 and the intermediate bore portion 32. Similarly, a second annular shoulder 44 is formed at the juncture of the other end of the intermediate bore portion 32 and the second end bore portion 34. The first end bore portion 30 is designed to receive at least one seal member 48, such as an O-ring, an optional sleeve or top hat 49, press fit in the bore portion 30 and enlarged, annular flange or bead 50 spaced from a tip end 52 of an endform, tube or conduit 54. The shoulder 42 acts as a seat for insertion of the O-ring 48, the top hat 49, and the annular flange 50, with the top hat 49 acting as an insertion limit or stop for the flange 50 of the endform 54 as shown in FIG. 4. The top hat 49 is press fit in the bore portion 30 to retain the O-ring portion 48 in the bore portion 30.

Figure 3A:
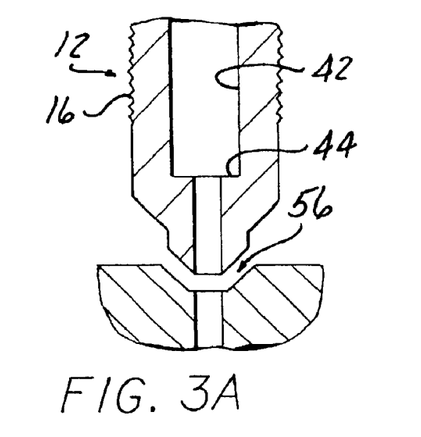
FIGS. 3A and 3B are partial, longitudinal cross-sectional, perspective views of different terminal ends of the housing of the fluid quick connect shown in FIG. 1.
Figure 3B:
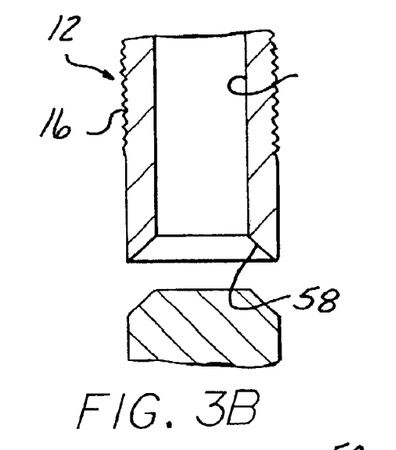

As shown in FIGS. 1, 2, 3A and 3B, the first end 18 of the housing 12 has a conical end shape denoted by reference number 53. Enhanced sealing with a conical seat formed in certain fluid operative devices 14 at the end of the bore 20 may be provided by mating annular surfaces formed on the first end 18 of the housing as shown in FIGS. 3A and 3B. In FIG. 3A, the first end of the housing 12 has a machined or precision formed, internal, conical seat 56 designed to mate with a complementary annular conical formed in the fluid use device 14. In FIG. 3B, first end of the housing 12 has an inverted, annular, conical shape surface 58 designed to mate with the external surface of a seat formed in the fluid operative device 14.

The fluid quick connect 10 includes a retainer means 60 formed of a retainer clip 62 movable mounted in an annular recess 64 formed in the first end 24 of the housing 12.

The retaining clip 62 is formed of a suitable spring or resilient material, such as spring metal. As shown in FIG. 1 the retaining clip 62, hereafter referred to simply as the clip 62, has a conical shape with a discontinuity or a split forming first and second ends 66 and 68, respectively. The discontinuity or split allows the first and seconds ends 66 and 68 to spread apart during engagement of the clip 62 with the annular flange 50 on the endform 54 during insertion of the endform 54 into the bore 26 in the housing 12.

The recess 64 is disposed at an angle with respect to the longitudinal axis of the bore 26. One sidewall 70 of the housing 12 forming one side of the recess 64 is initially formed parallel to the longitudinal axis of the bore 26 as shown in the preassembled state of the housing 12 in FIGS. 2A and 2B. This allows the clip 62 to be inserted through the first end 24 of the housing 12 into the recess 64, see FIG. 2B.

Figure 2C:
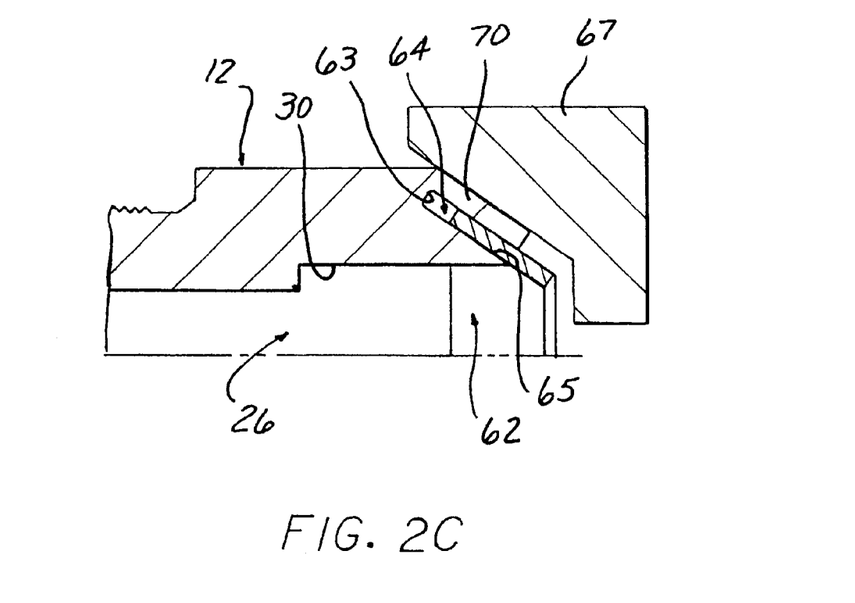
Figure 5:
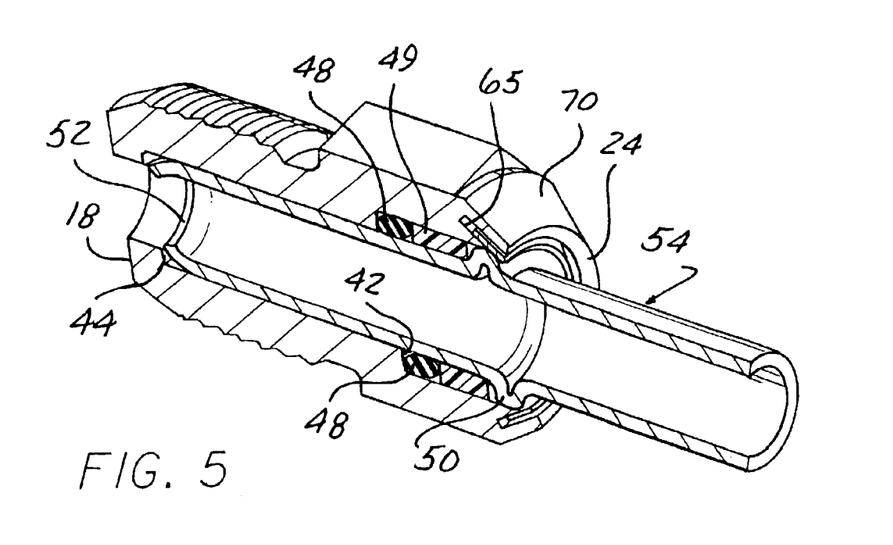
FIG. 5 is a longitudinal cross-sectional, perspective view of the fluid quick connect of FIG. 1 depicted in an assembled state.
Figure 6:
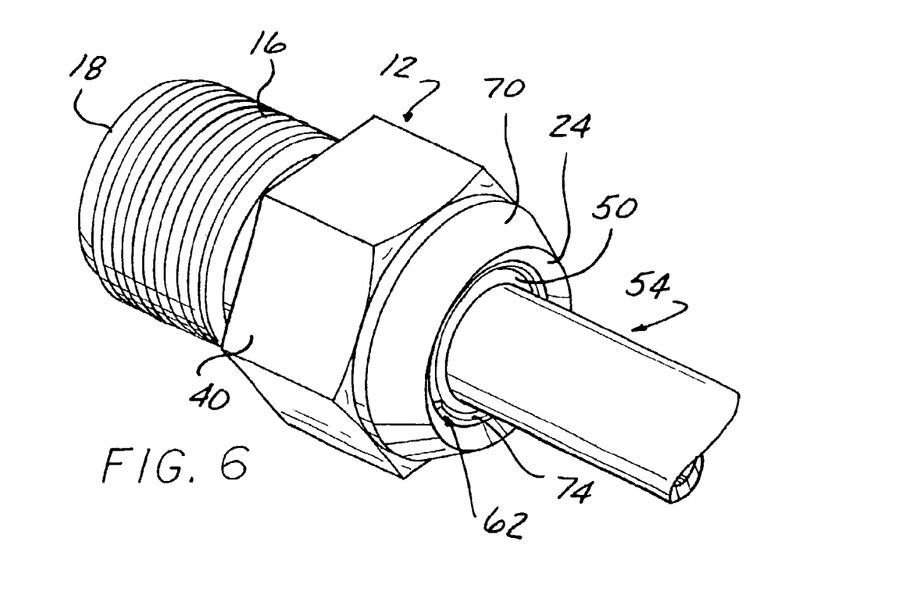
FIG. 6 is an exterior, perspective view of the assembled fluid quick connect shown in FIG. 5.

The sidewall 70 is then formed, such as by swaging, into a conical position generally parallel to the opposed wall 65 of the recess 64, as shown in FIGS. 2C, 5 and 6, by advance of a suitably formed tool or die 67. Thus, the walls 70 and 65 are disposed in parallel to define the conical annular recess 64 in which the clip 62 is trapped; but still capable of sliding moving as described hereafter.

The width of the recess 64 is determined by the width of a flat 63 formed at one end of the wall 65 as well as the length of the wall 70. The interface of the tool or die 67 will bend the wall 70 radially inward to the position shown in FIG. 2C wherein the wall 70 is parallel to the wall surface 65 as described above.

The recess 64 as well as the shape of the clip 62 have been defined as being generally conical. However, it will be understood that other shapes, including a polygonal shape, i.e., square, recess, etc., and a complimentary formed clip may also be employed as the angular shape of the recess need only be capable of deforming or bending the resilient material of the clip 62 as the clip 62 moves within the recess 64 by interaction with the annular flange 50 on the endform 54 to cause energy to be stored in the clip 62 by deformation or bending. It is this energy, when released by the sliding insertion of the flange 50 past the leading edge 74 of the clip 62 which will cause the clip 62 to return to its normal position in the recess 64 latching the end form in the housing.

The resiliency of the clip 62 will normally bias the clip 62 to the smallest inner diameter with the closest spacing between the first and second ends 66 and 68. This will cause the clip 62 to slide downwardly in the recess 64 until the leading edge 74 projects a short distant outwardly from the open end of the recess 64 in the housing 12 as shown in FIG. 2C.

As the tip end 52 of the endform 54 is inserted into the bore 26 in the in the housing 12, the leading edge of the annular flange 50 on the end form 54 will contact the leading edge 74 of the clip 62 and force the clip 62 to slide angularly outward further into the recess 64 as shown in FIG. 4A. This angular sliding movement of the clip 62 is accompanied by a reversible deformation or separation of the first and second ends 66 and 68 which causes energy to be stored in the clip 62 as it is held in the expanded position shown in FIG. 4A within the recess 64 in the housing 12 by contact with the flange 50.

As insertion of the endform 54 into the bore 26 in the housing 12 continues, the outermost surface of the annular flange 50 on the endform 54 will pass beyond the leading edge 74 of the clip 62. At this time, as shown in FIG. 4B, the energy stored in the clip 62 will cause the clip 62 to move downwardly along the recess 64 to its normal position shown in FIG. 5 with the first and second ends 66 and 68 closely spaced. This will in turn cause the leading edge 74 of the clip 62 to move and project outwardly from the open end of the recess 64. At the same time, an inner surface of the clip 62, as shown in FIG. 4B, will be behind against the annular flange 50 on the endform 54 to prevent retraction of the endform 54 from the housing 12.

Figure 7:
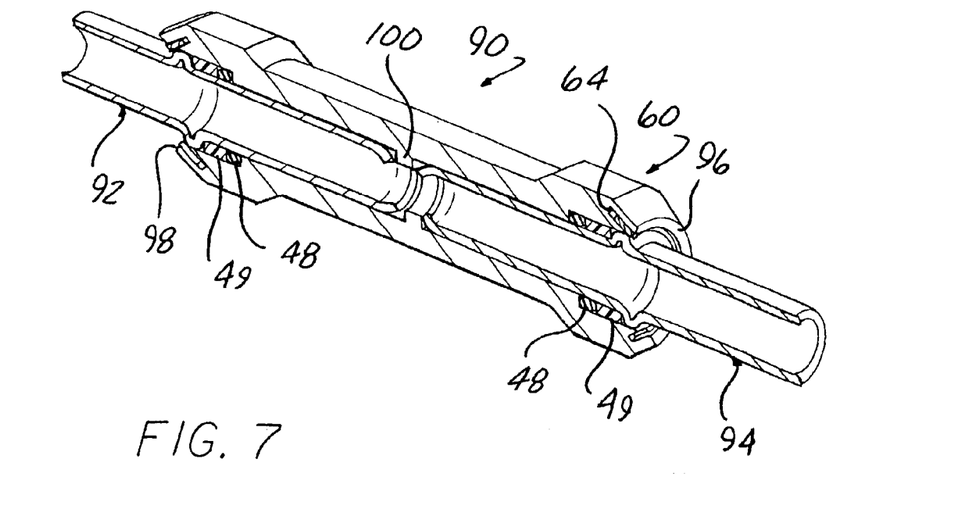
FIG. 7 is a longitudinal cross-sectional, perspective view of another aspect of the fluid quick connect of the present invention.

Referring now to FIG. 7 there is depicted the use of the retainer means 60 in a single point housing 90 designed to fluidly connect two tubular endforms 92 and 94, both of which are constructed substantially identical to the endform 54 in that each has an annular flange spaced from a tip end.

The housing 90 also includes two opposite, co-axial stepped bores extending between and first end 96 and an opposed second end 98. An optional annular, reduced diameter shoulder 100 is formed intermediate to the first and second ends 96 and 98 of the housing 90.

The first and second ends 96 and 98 of the housing 90 include the retainer means 60 described above and shown in FIGS. 1 and 5 to securely attach each endform to the housing 90.

Figure 8:
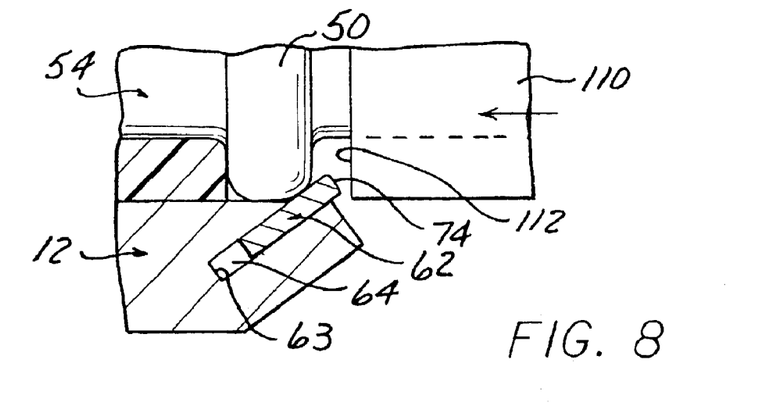
FIG. 8 is a longitudinal, cross-sectional view showing the operation of the release tool of the present invention.

Finally, a release tool 110 is shown in FIG. 8, for disengaging the endform 54 from the housing 12 or either of the endforms 92 and 94 from the housing 90. The release tool 110 is in the form a cylindrical member which may be premounted on each endform 54, 92 or 94 or applied after assembly of the endforms to the respective housing by means of a split formed in the release tool 110. A leading edge 112 of the release tool 110 may be formed with a flared outer diameter or as a simple flat edge having a diameter to engage and force the leading edge 74 of the clip 62 angularly outward into the recess 64 in the housing 12 a sufficient distant to allow the leading edge 74 to clear the outer diameter of the flange 50 on the endform 54, for example, and be withdrawn from the housing 12.

What is claimed is:

1. A fluid quick connect for fluidically coupling an endform having an enlarged annular flange spaced from one end and a fluid operative device, the fluid quick connect comprising:

a housing having a through bore extending from a first end;

a conical recess formed in the housing adjacent to the first end of the housing, the recess having an open first end, the recess defining opposed spaced, conical surfaces extending from the first smaller diameter open end communicating with the bore in the housing to a second larger diameter end; and a retainer captured by the recess, the retainer having a conical body with a through aperture, a split in the conical body forming first and second circumferentially expandable ends, the retainer moveable from a first position by interference between a leading edge of the body extending through the first open end of the recess and an annular flange on an endform inserted through the first end of the housing to a second position in the recess and radially spaced from the first position allowing passage of the annular flange past the leading edge of the retainer, the retainer radially expanding in the recess during movement to the second position to store spring energy, the retainer moveable back to the first position by release of the stored spring energy, after the annular flange on the endform has been inserted past the leading edge of the retainer to latch the endform in the housing by interference of the leading edge of the retainer body and the annular flange on the endform.

2. The quick connect of claim 1 further comprise:

seal means mounted in the bore of the housing for sealing the endform to the housing.

3. The quick connect of claim 2 wherein the seal means further comprises:

a cylindrical sleeve disposed in the bore adjacent a seal member.

4. The quick connect of claim 3 wherein:

the sleeve is fixedly mounted in the bore in the housing.

5. The quick connect of claim 1 further comprising:

a second end of the housing configured for mounting in a fluid operable device.

6. The quick connect of claim 5 further comprising:

a plurality of threads formed adjacent to the second end of the housing for threaded mounting of the housing in the fluid operative device.

7. The quick connect of claim 5 further comprising:

a conical surface formed on the second end of the housing for sealing mating engagement with a complimentary seat formed in a fluid operative device.

8. The quick connect of claim 1 further comprising:

seal means mounted in the bore of the housing for sealing an endform to the housing; and a cylindrical sleeve disposed in the bore adjacent the seal means.

9. The quick connect of claim 8 wherein:

the cylindrical sleeve is stationarily fixed in the bore of the housing.

10. A fluid quick connect for fluidically coupling an endform having an enlarged annular flange spaced from one end and a fluid operative device, the fluid quick connect comprising:

a housing having a through bore extending from a first end;

a conical recess formed in the housing adjacent to the first end of the housing, the recess having an open first end, the recess defining opposed spaced, conical surfaces extending from the first smaller diameter open end communicating with the bore in the housing to a second larger diameter end;

a retainer captured by the recess, the retainer having a conical body with a through aperature, a split in the conical body forming first and second circumferentially expandable ends, the retainer moveable from a first position by interference between a leading edge of the body extending through the first open end of the recess and an annular flange on an endform inserted through the first end of the housing to a second position in the recess axially and radially spaced from the first position allowing passage of the annular flange past the leading edge of the retainer, the retainer radially expanding in the recess during movement to the second position to store spring energy, the retainer moveable back to the first position by release of the stored spring energy after the annular flange on the endform has been inserted past the leading edge of the retainer to latch the endform in the housing by interference of the leading edge of the retainer body and the annular flange on the endform; and a conical surface formed on the second end of the housing for sealing mating engagement with a complimentary seat formed in a fluid operative device, the seat being one of external and internal.

11. A fluid quick connect for fluidically coupling an endform having an enlarged annular flange spaced from one end and a fluid operative device, the fluid quick connect comprising:

a housing having a through bore extending from a first end;

a conical recess formed in the housing adjacent to the first end of the housing, the recess having an open first end, the recess defining opposed spaced, conical surfaces extending from the first smaller diameter open end communicating with the bore in the housing to a second larger diameter end;

a retainer captured by the recess, the retainer having a conical body with a through aperature, a split in the conical body forming first and second circumferentially expandable ends, the retainer moveable from a first position by interference between a leading edge of the body extending through the first open end of the recess and an annular flange on an endform inserted through the first end of the housing to a second position in the recess axially and radially spaced from the first position allowing passage of the annular flange past the leading edge of the retainer, the retainer radially expanding in the recess during movement to the second position to store spring energy, the retainer moveable back to the first position by release of the stored spring energy after the annular flange on the endform has been inserted past the leading edge of the retainer to latch the endform in the housing by interference of the leading edge of the retainer body and the annular flange on the endform;

another conical recess formed in a second end of the housing; and another retainer removably captured by the another recess for latching another endform in the second end of the housing.

12. A fluid quick connect for fluidically coupling two endforms, each having an enlarged annular flange spaced from one end, the fluid quick connect comprises:

a housing having a through bore extending between first and second ends;

first and second recesses having opposed conical surfaces respectively formed in the housing at the first and second ends of the housing, each of the first and second recesses communicating at one end with the bore in the housing; and a retainer captured by the recess, the retainer having a conical body with a through aperture, a split in the conical body forming first and second circumferentially expandable ends, the retainer moveable from a first position by interference between a leading edge of the body extending through the first open end of the recess and an annular flange on an endform inserted through the first end of the housing to a second position in the recess axially and radially spaced from the first position allowing passage of the annular flange past the leading edge of the retainer, the retainer radially expanding in the recess during movement to the second position to store spring energy, the retainer moveable back to the first position by release of the stored spring energy after the annular flange on the endform has been inserted past the leading edge of the retainer to latch the endform in the housing by interference of the leading edge of the retainer body and the annular flange on the endform.

13. The quick connect of claim 12 wherein the retainer comprises:

a conical body having a through aperture.

14. The quick connect of claim 13 wherein the retainer further comprises:

a discontinuity formed in the conical body forming first and second circumferentially expandable ends in the body.

15. The quick connect of claim 12 further comprising:

seal means mounted in the bore of the housing for sealing an endform to the housing.

16. The quick connect of claim 12 wherein the seal means further comprises:

a cylindrical sleeve disposed in the bore adjacent a seal member.

17. A fluid coupling comprising:

an endform having an enlarged diameter annular flange spaced from a tip end;

a fluid use device having a bore extending from an open end;

a fluid quick connect for fluidically coupling the endform and the fluid use device, the fluid quick connect including:

a housing having a through bore extending between first and second ends;

means for mounting the second end of the housing to the fluid use device;

a conical recess formed in the housing adjacent to the first end of the housing, the recess having a open first end, the recess defining opposed spaced, conical surfaces extending from the first smaller diameter open end communicating with the bore in the housing to a second larger diameter end; and a retainer captured by the recess, the retainer having a conical body with a through aperture, a split in the conical body forming first and second circumferentially expandable ends, the retainer movable from a first position by interference between a leading edge of the body extending through the first open end of the recess and, an annular flange on an endform inserted through the first end of the housing to a second position in the recess axially and radially spaced from the first position allowing passage of the annular flange past the leading edge of the retainer, the retainer radially expanding in the recess during movement to the second position to store spring energy, the retainer moveable back to the first position by release of the stored spring energy after the annular flange on the endform has been inserted past the leading edge of the retainer to latch the endform in the housing by interference of the leading edge of the retainer body and the annular flange on the endform.

18. The fluid coupling of claim 17 further comprise:

seal means mounted in the bore of the housing for sealing the endform to the housing.

19. The fluid coupling of claim 18 wherein the seal means further comprises:

a cylindrical sleeve disposed in the bore adjacent a seal member.

20. The fluid coupling of claim 19 wherein:

the sleeve is fixedly mounted in the bore in the housing.

21. The fluid coupling of claim 17 further comprising:

the second end of the housing configured for mounting in a fluid use device.

22. The fluid coupling of claim 21 further comprising:

a plurality of threads formed adjacent to the second end of the housing for threaded mounting of the housing in the fluid use device.

23. The fluid coupling of claim 21 further comprising:

another conical surface formed on the second end of the housing for sealing mating engagement with a complimentary seat formed in a fluid use device.

24. A fluid coupling comprising:

an endform having an enlarged diameter annular flange spaced from a tip end;

a fluid use device having a bore extending from an open end; a fluid quick connect for fluidically coupling the endform and the fluid use device, the fluid quick connect including:

a housing having a through bore extending between first and second ends;

means for mounting the second end of the housing to the fluid use device; a conical recess formed in the housing adjacent to the first end of the housing, the recess having an open first end, the recess defining opposed spaced, conical surfaces extending from the first smaller diameter open end communicating with the bore in the housing to a second larger diameter end;

a retainer captured by the recess, the retainer having a conical body with a through aperture, a split in the conical body forming first and second circumferentially expandable ends, the retainer moveable from a first position by interference between a leading edge of the body extending through the first open end of the recess and an annular flange on an endform inserted through the first end of the housing to a second position in the recess axially and radially spaced from the first position allowing passage of the annular flange past the leading edge o the retainer, the retainer radially expanding in the recess during movement to the second position to store spring energy, the retainer moveable back to the first position by release of the stored spring energy after the annular flange on the endform has been inserted past the leading edge of the retainer to latch the endform in the housing by interference of the leading edge of the retainer body and the annular flange on the endform; and a conical surfaced formed on the second end of the housing for sealing mating engagement with a complimentary seat formed on a fluid use device, the conical seat being one of external and internal.

25. A fluid coupling comprising:

an endform having an enlarged diameter annular flange spaced from a tip end;

a fluid use device having a bore extending from an open end;

a fluid quick connect for fluidically coupling the endform and the fluid use device, the fluid quick connect including:

a housing having a through bore extending between first and second ends;

means for mounting the second end of the housing to the fluid use device;

a conical recess formed in the housing adjacent to the first end of the housing, the recess having an open first end, the recess defining opposed spaced, conical surfaces extending form the first smaller diameter open end communicating with the bore in the housing to a second larger diameter end; and a retainer captured by the recess, the retainer having a conical body with a through aperture, a split m the conical body forming first and second circumferentially expandable ends, the retainer moveable from a first position by interference between a leading edge of the body extending through the first open end of the recess and an annular flange on an endform inserted through the first end of the housing to a second position in the recess axially and radially spaced from the first position allowing passage of the annular flange past the leading edge of the retainer, the retainer radially expanding in the recess during movement to the second position to store spring energy, the retainer moveable back to the first position by release of the stored spring energy after the annular flange on the endform has been inserted past the leading edge of the retainer to latch the endform in the housing by interference of the leading edge of the retainer body and the annular flange on the endform;

another conical recess formed in the second end of the housing; and another retainer removably captured by the another recess for latching an annular flange on a fluid use device in the second end of the housing.

* * * * *